United States Patent [19]

Lee

[11] 3,929,717

[45] Dec. 30, 1975

[54] ALCOHOL SENSITIVE REPAIRABLE EPOXY EMBEDDING MATERIAL

[75] Inventor: S. Yen Lee, Upper Marlboro, Md.

[73] Assignee: The United States of America as represented by the Secretary of the Army, Washington, D.C.

[22] Filed: June 28, 1974

[21] Appl. No.: 484,037

[52] U.S. Cl.... 260/37 EP; 260/830 TW; 260/830 R
[51] Int. Cl.² ......................................... C08L 63/00
[58] Field of Search...... 260/37 EP, 830 TW, 837 R

[56] References Cited
UNITED STATES PATENTS 3,299,169  1/1967  Smith............................ 260/830 TW
3,316,323  4/1967  Wille et al. ................... 260/830 TW Primary Examiner—Lewis T. Jacobs
Attorney, Agent, or Firm—Nathan Edelberg; Robert P. Gibson; Saul Elbaum

[57] ABSTRACT

An epoxy embedding composition which is useful for potting of electrical and electronic components and which is easily removable therefrom for purposes of repair of the components, which comprises the combination of a diglycidyl ether of a dihydroxy phenol, a diglycidyl ether of polyoxyalkylene glycol, a polyoxyalkylenediamine, a primary or secondary alkyl, alkanol or aryl amine and, as a filler, polyvinyl pyrrolidone.

5 Claims, No Drawings

ALCOHOL SENSITIVE REPAIRABLE EPOXY EMBEDDING MATERIAL

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates generally to epoxy embedding or potting compounds, and more particularly to an epoxy composition containing a filler, which can be used for embedding or potting of electrical or electronic components, and which is easily removable from said components by the use of an alcohol solvent.

2. Description of the Prior Art

Epoxy resin compositions are widely used for embedding or potting of electronic and electrical components for mechanical and environmental protection. The resin is particularly popular because of its versatility in molecular weight, viscosity, cures, as well as other properties. However, one problem has been recognized in that heretofore it has been quite difficult to remove the embedding material in the event that repair of the embedded components becomes necessary. The process of removing the potting or embedding material usually involves repeated cycles of solvent soaking, or soaking in a material which is reactive to the embedding compound. Even then, tedious mechanical picking or digging has been required. The potential for damage to the embedded electrical components was quite high, either as a result of contact with the solvents or the reactive agents, or by mechanical injury occurring during the picking and digging operations.

Recently, some epoxy resins which can fairly easily be removed have become available, however, those known to this inventor achieve this ease of removability only by sacrificing mechanical or other properties essential to its use as an embedding material. Representative of known epoxy compositions are U.S. Pat. Nos. 3,567,677; 3,229,169; 3,409,591; 3,376,257; 3,213,158; and 2,512,996.

Accordingly, a need continues to exist for an embedding, or potting epoxy composition which is characterized by good mechanical and electrical properties, which can easily be removed without risk of injury to any embedded electronic components.

SUMMARY OF THE INVENTION

Accordingly, it is one object of this invention to provide an epoxy potting composition which can be used for embedding electrical or electronic components, wherein the composition can be easily removed from the electrical components without causing injury to most types of components.

It is another object of this invention to provide a potting composition which can be removed from embedded electrical and electronic components using an alcohol solvent, which is essentially non-injurious to the embedded components, and wherein said removal can be accomplished with the use of such a slight mechanical force as to dissipate the risk of damage to the embedded components.

These and other objects of this invention, as will hereinafter become more readily understood by reference to the following description, have been accomplished by the combination of (1) a diglycidyl ether of a dihydroxy phenol, (2) a diglycidyl ether of polyoxyalkylene glycol, (3) a polyoxyalkylene diamine, (4) a primary or secondary alkyl, alkanol or aryl amine, and (5) polyvinylpyrrolidone, as a filler.

DESCRIPTION OF THE PREFERRED EMBODIMENT

Illustrative of the diglycidyl ethers of dihydroxy phenols employed are those prepared by reacting a bisphenol, e.g., 4,4'-isopropylidenediphenol (known commonly as bisphenol A) with a 4 to 10 molar excess of epichlorohydrin, while adding an aqueous NaOH solution slowly thereto until a slight molar excess thereof, based on the hydroxyls of the diphenol, has been added. The diglycidyl ethers of dihydroxy phenols employed in the invention may be considered to be predominantly those which have the following formula:

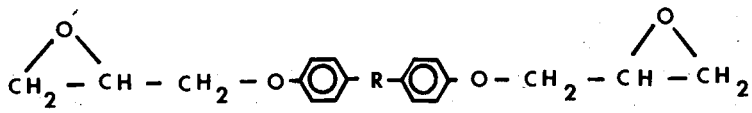

wherein R is the residue of the isoalkylidene group having between 1 and 4 carbon atoms.

There will be present varying minor amounts of higher molecular weight polyethers of the nature of:

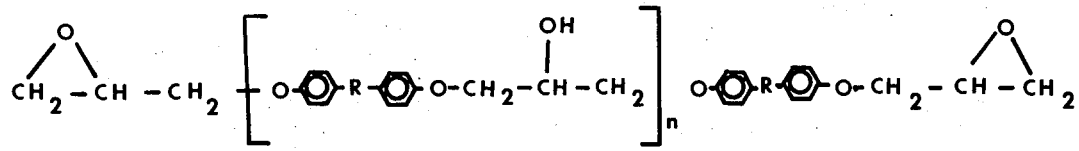

wherein $n$ has an average value of from less than 1 to about 4. It is to be understood that, although there are usually two terminal oxirane groups present, as shown in the formulae above, a minor proportion of the ether formed may have only 1 or an occasional molecule may have no terminal oxirane group. Also, it is known to be common in commercial epoxy resins that a very small amount of some monoepoxy diluent can be added to adjust the viscosity of the epoxy. Accordingly, the term diglycidyl ethers, as used herein, includes glycidyl ethers which have somewhat less than an average 2 oxirane groups per molecule, e.g., from about 1.5 to 2, usually an average of about 1.8 or 1.9, such groups per molecule.

Diglycidyl ethers of dihydroxy phenols useful in the practice of the invention are those having epoxide equivalent weight of between about 174 to about 200.

By the term, epoxide equivalent weight, is meant the weight of resin necessary to produce one equivalent weight oxirane group. If the average number of oxirane groups were 2, the epoxide equivalent weight would equal exactly half of the molecular weight. It also follows that the lower the epoxide equivalent weight of a diglycidyl ether of a given diphenol, the fewer repeating ether units there are present.

The preferred diglycidyl ether of dihydroxy phenol used in the practice of this invention is Epon 815, which has an E.E.W. (epoxide equivalent weight) of 175–195.

The diglycidyl ethers of a polyoxyalkyleneglycol useful in the practice of the invention may be prepared by reacting such polyglycol, e.g., polyoxypropylene glycol with epichlorohydrin in the presence of a suitable catalyst, e.g., $BF_3$ followed by dehydrohalogenation to produce an ether having the formula:

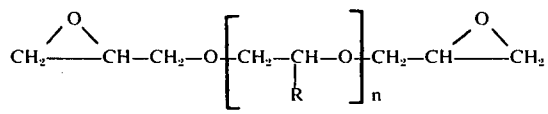

wherein R is H or a lower alkyl group and n has an average of from 1 to about 90. Minor amounts of chlorine sometimes remain after dehydrohalogenation, thereby resulting in an occasional chloromethyl substituent e.g., when polyoxypropylene glycol is employed an occasional

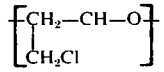

may be present.

Illustrative of the polyoxyalkylene diamines to employ in the practice of the invention are polyoxyethylenediamine, polyoxypropylenediamine, polyoxybutylenediamine, polyoxyamylenediamine, and polyoxyhexylenediamine. The following formula represents the polyoxyalkylenediamine used in preparing the cured thermosetting resin of the invention.

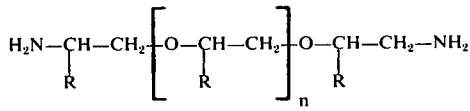

wherein R is H or a lower alkyl group and n is from 0 to about 4.

A satisfactory way of making polyoxyalkylenediamine for use herein is described in U.S. Pat. No. 2,412,209.

The alkyl, alkanol, aralkyl and aryl amines, which may be optionally employed as an auxiliary curing agent in the practice of the invention are any having from 1 to about 8 carbon atoms per alkyl or alkanol substituent.

The diglycidyl ether of dihydroxyphenol is used in an amount of 10 to 90 parts by weight, preferably 50 to 70 parts by weight. The diglycidyl ether of polyoxyalkylene glycol is used in an amount of 90 to 10 parts by weight, preferably 50 to 30 parts by weight. The diamine is used in an amount of 5 to 30 parts by weight, preferably 25 to 30 parts by weight, the amine catalyst is used in an amount of 1 to 5 parts by weight, and the polyvinylpyrrolidone (PVP) filler is used in an amount of 10 to 100 parts by weight, preferably 10 to 80 parts by weight.

The exact amount of amine and diamine can be calculated according to the EEP, and amine equivalent per active hydrogen atom. The particle size of PVP is not so critical. In order to obtain a partial solution or a stable and uniform dispersion of PVP, particle sizes in the range of 50 to 200 mesh would be advisable.

One of the interesting aspects of this invention is that the compound can be used to pot or embed electrical components, and can be thereafter easily removed without injury to the components. This is easily accomplished by the use of an alcohol, particularly the lower alkanols, such as methanol, ethanol, propanol and butanol, which will have little effect on the embedded component. The sensitivity of the epoxy composition of this invention will be proportional to the amount of PVP filler. Increasing the quantity of filler will result in an increase in the ease of removal of the epoxy composition from embedded components, with the alcohol.

Although alcohols have been mentioned here as a particularly good solvent for the removal of the composition, other solvents may also be useful for this same purpose. The alcohols have been mentioned primarily because they are known to be essentially harmless to electrical and electronic components which are likely to be embedded or potted into this type of composition.

One difficulty which does pertain with the use of a filler such as PVP is that it is hygroscopic, and tends to pick up water moisture from the atmosphere. When PVP is used in large quantities, the degree of water absorption can be fairly severe in some environments, and if the humidity is high enough, undesirable effects can be caused.

Accordingly, in some situations, it is advantageous to coat the epoxy composition of this invention with a thin moisture barrier. Suitable moisture barriers which can be used for this purpose include petroleum waxes, polyethylene or mixtures of a conventional polyepoxide, such as the diglycidyl ether of polyhydroxyphenol, discussed above, cured with an amine curing agent as discussed above, and in the quantities as discussed above. Other suitable moisture barriers include cellulose acetate, polyvinyl chloride, or the like. In removing the embedding composition which contains a moisture barrier, it is only necessary to first strip off the thin moisture barrier coating (usually $1 - 10\mu$), and then to expose the underlying epoxy to the alcohol, for a time sufficient to cause softening of the epoxy (usually 3 minutes to 1 hour). The alcohol can be moderately treated if desired, and the compound can be removed with as little mechanical effort as the use of a fingernail.

Having generally described the invention, a more complete understanding can be obtained by reference to the following example, which is included for purposes of illustration only and is not intended to be limiting unless otherwise specified.

EXAMPLE 70.0 parts by weight of Epon 815 was admixed with 30.0 parts by weight of the diglycidyl ether of polyoxyalkyleneglycol (Epoxy DER 736, Dow Chemical). 26.5 Parts by weight polyoxyalkyleneamine (Jefferamine D230), 5.3 parts by weight amine catalyst (Jefferson accelerator 298) and 80.0 parts by weight poly(n-vinylpyrrolidone) (GAF K-30); was admixed and cured at 70°C for 2 hours, after an electrical component was embedded therein. The tensile strength of the composition was 3,700 psi at break, the elongation at break was 2% the Shore D hardness was 74, the water absorption over 24 hours, 1/8 in. thickness was 17.38%.

The composition was coated with a mixture of 100 parts by weight of Epon 815, 43 parts by weight of polysulfide (Thiohel LP-3), and 10 parts by weight of diethylenetriamine which was cured at 70°C for 2 hours. No change in electrical resistance could be measured for a component embedded in the combination after 12 days.

Having now fully described the invention, it will be apparent to one of ordinary skill in the art that many changes and modifications can be made thereto without departing from the spirit or scope of the invention as set forth herein.

I wish it to be understood that I do not desire to be limited to the exact details of construction shown and described, for obvious modifications can be made by a person skilled in the art.

What is claimed as new and intended to be covered by letters patent is:

1. An epoxy embedding composition which is useful for potting of electrical and electronic components and which is easily removable therefrom for purposes of repair of the components, which comprises: the combination of diglycidyl ether of a dihydroxyphenol, a diglycidyl ether of a polyoxyalkylene glycol, a polyoxyalkylenediamine, a primary or secondary alkyl, alkanol or aryl amine and, a filler, polyvinylpyrolidone wherein the polyvinylpyrrolidone filler is present in an amount of 10 to 100 parts by weight per 10 to 90 parts by weight diglycidyl ether of dihydroxyphenol, 90 to 10 parts by weight of diglycidyl ether of polyoxyalkylene glycol and 1 to 5 parts by weight of said primary or secondary alkyl, alkanol or aryl amine.

2. The composition of claim 1, wherein said polyoxyalkylenediamine is polyoxyethylenediamine, polyoxypropylenediamine, polyoxybutylenediamine, polyoxyamylenediamine or polyoxyphexylenediamine.

3. The composition of claim 1, wherein said diglycidyl ether of polyoxyalkyleneglycol is the reaction product of epichlorohydrin and polyoxypropylene glycol.

4. The composition of claim 1, wherein said diglycidyl ether of dihydroxyphenol has an epoxide equivalent of about 174 to about 200.

5. The composition of claim 1, wherein said alkyl or alkanolamine contains from 1 to 8 carbon atoms per alkyl or alkanol substituent.

* * * * *